United States Patent
Sakamoto et al.

(10) Patent No.: US 7,126,306 B2
(45) Date of Patent: Oct. 24, 2006

(54) MOTOR CONTROL UNIT

(75) Inventors: Keiji Sakamoto, Hachioji (JP); Hisashi Maeda, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 10/848,129

(22) Filed: May 19, 2004

(65) Prior Publication Data

US 2005/0001581 A1   Jan. 6, 2005

(30) Foreign Application Priority Data

May 23, 2003   (JP) ............................. 2003-146595

(51) Int. Cl.
H02P 1/46 (2006.01)
H02P 6/00 (2006.01)
H02P 25/00 (2006.01)
H02P 27/00 (2006.01)

(52) U.S. Cl. ...................... 318/723; 318/807; 318/606; 318/811; 318/599; 318/254

(58) Field of Classification Search ................ 318/254
See application file for complete search history.

(56) References Cited

U.S. PATENT DOCUMENTS

| | | | | | |
|---|---|---|---|---|---|
| 2,437,093 | A | * | 3/1948 | Huge | 363/172 |
| 3,763,417 | A | * | 10/1973 | Johnston | 318/810 |
| 4,882,524 | A | * | 11/1989 | Lee | 318/254 |
| 5,173,651 | A | * | 12/1992 | Buckley et al. | 318/701 |
| 5,227,963 | A | * | 7/1993 | Schauder | 363/41 |
| 5,747,972 | A | * | 5/1998 | Baretich et al. | 323/223 |
| 5,786,673 | A | * | 7/1998 | Johnson | 318/139 |
| 6,005,364 | A | * | 12/1999 | Acarnley | 318/632 |
| 6,229,288 | B1 | * | 5/2001 | Baretich et al. | 323/223 |
| 6,288,507 | B1 | * | 9/2001 | Makino et al. | 318/293 |
| 6,366,062 | B1 | * | 4/2002 | Baretich et al. | 323/223 |
| 6,404,152 | B1 | * | 6/2002 | Kobayashi et al. | 318/254 |
| 6,636,008 | B1 | * | 10/2003 | Yamada et al. | 318/254 |
| 6,700,343 | B1 | * | 3/2004 | Masaki et al. | 318/434 |
| 6,731,083 | B1 | * | 5/2004 | Marcinkiewicz | 318/254 |
| 2002/0163319 | A1 | * | 11/2002 | Kaneko et al. | 318/727 |
| 2004/0178764 | A1 | * | 9/2004 | Kaku et al. | 318/716 |
| 2005/0127857 | A1 | * | 6/2005 | Miyauchi | 318/254 |

FOREIGN PATENT DOCUMENTS

| | | |
|---|---|---|
| JP | 55-023717 | 2/1980 |
| JP | 6-098596 | 4/1994 |
| JP | 6-133558 | 5/1994 |
| JP | 06-133558 | 5/1994 |
| JP | 11-069899 | 3/1999 |
| JP | 2004-080975 | 3/2004 |

* cited by examiner

OTHER PUBLICATIONS

Notice of Grounds of Rejection (Office Action) for corresponding Japanese Appln. No. 2003-146595 dated Jun. 7, 2005.

*Primary Examiner*—Lincoln Donovan
*Assistant Examiner*—Renata McCloud
(74) *Attorney, Agent, or Firm*—Staas & Halsey LLP

(57) ABSTRACT

Windings of each phase in a three-phase AC motor are independent of one another. A motor control unit gives, to windings of each phase (U, V and W-phase), currents (IU, IV, IW) obtained by adding, to a fundamental sine wave current, a current having a frequency which is three times as high as that of the fundamental sine wave current. That is, $$IU = I \cdot \sin \omega t + Ia \cdot \sin 3\omega t;$$

$$IV = I \cdot \sin(\omega t + 2/3\pi) + Ia \cdot \sin 3\omega t;$$

$$IW = I \cdot \sin(\omega t + 4/3\pi) + Ia \cdot \sin 3\omega t$$

Also, amplitude Ia of a current having a frequency which is three times as high as that of the fundamental sine wave current is set to a predetermined value smaller than amplitude I of the fundamental sine wave current.

4 Claims, 7 Drawing Sheets

RELATED ART

MOTOR CONTROL UNIT

BACKGROUND OF THE INVENTION

1. Field of the Invention

The present invention relates to a control unit for a three-phase AC motor.

2. Description of the Related Art

Conventionally, in the three-phase AC motor, a sine wave current of a fundamental frequency has been caused to flow through each phase to drive the motor. The maximum torque that the motor is capable of outputting is determined by a peak current value of the sine wave current for flowing through each phase, that is, magnitude of amplitude.

In order to improve voltage utilization efficiency, there is known a control method for superimposing a voltage command having a frequency which is three times as high as a fundamental frequency on a voltage command of the fundamental frequency to each phase into the voltage command, creating a PWM signal and driving an inverter (See Japanese Patent Application Laid-Open Nos. 6-133558 and 11-69899).

In the invention described in the above-described patent document, the voltage utilization efficiency is improved by superimposing, on voltage of the fundamental sine wave, voltage having a frequency which is three times as high as the frequency of the fundamental sine wave to obtain each phase voltage command. A current flowing through each phase is sine wave, the maximum current value is a peak value of the sine wave, and the torque cannot be increased by any other than this peak value, that is, enlargement of the amplitude.

SUMMARY OF THE INVENTION

According to the present invention, in a control unit for a three-phase AC motor such as a synchronous motor or an induction motor which is constructed of each winding of three phases which is independent of one another, a current obtained by adding the fundamental sine wave current to current having a frequency which is three times as high as that of the fundamental sine wave current is given to windings of each phase for driving and controlling the three-phase AC motor. The current obtained by adding the fundamental sine wave current to current having a frequency which is three times as high as that of the fundamental sine wave current is, independently for each phase, supplied by a combination of a first series circuit comprising first and second switching elements connected in series, and a second series circuit comprising third and fourth switching elements connected in series.

Specifically, a command value obtained by adding, to the fundamental sine wave current, a current having a frequency of three times as high as that of the fundamental sine wave current, and an inverted command value obtained by inverting the command value are compared with a triangular wave to determine a switching control signal; on the basis of a switching signal determined by the command value, the first and second switching elements are ON/OFF controlled; on the basis of a switching signal obtained by the inverted command value, the third/fourth switching elements are ON/OFF controlled; through windings of each phase, a current obtained by adding, to the fundamental sine wave current, a current having a frequency of three times as high as that of the fundamental sine wave current is caused to flow. Also, amplitude of the current having a frequency which is three times as high as that of the fundamental sine wave current will be set to smaller amplitude than the amplitude of the fundamental sine wave current.

According to the present invention, it is possible to provide a motor control unit capable of increasing output torque of the motor even if the peak value of the sine wave current of the fundamental frequency is not increased.

BRIEF DESCRIPTION OF THE DRAWINGS

The foregoing and other purposes, aspects and advantages of the present invention will be better understood from the following detailed description of embodiments with reference to the drawings, in which.

DESCRIPTION OF THE EMBODIMENTS

Figure 1:
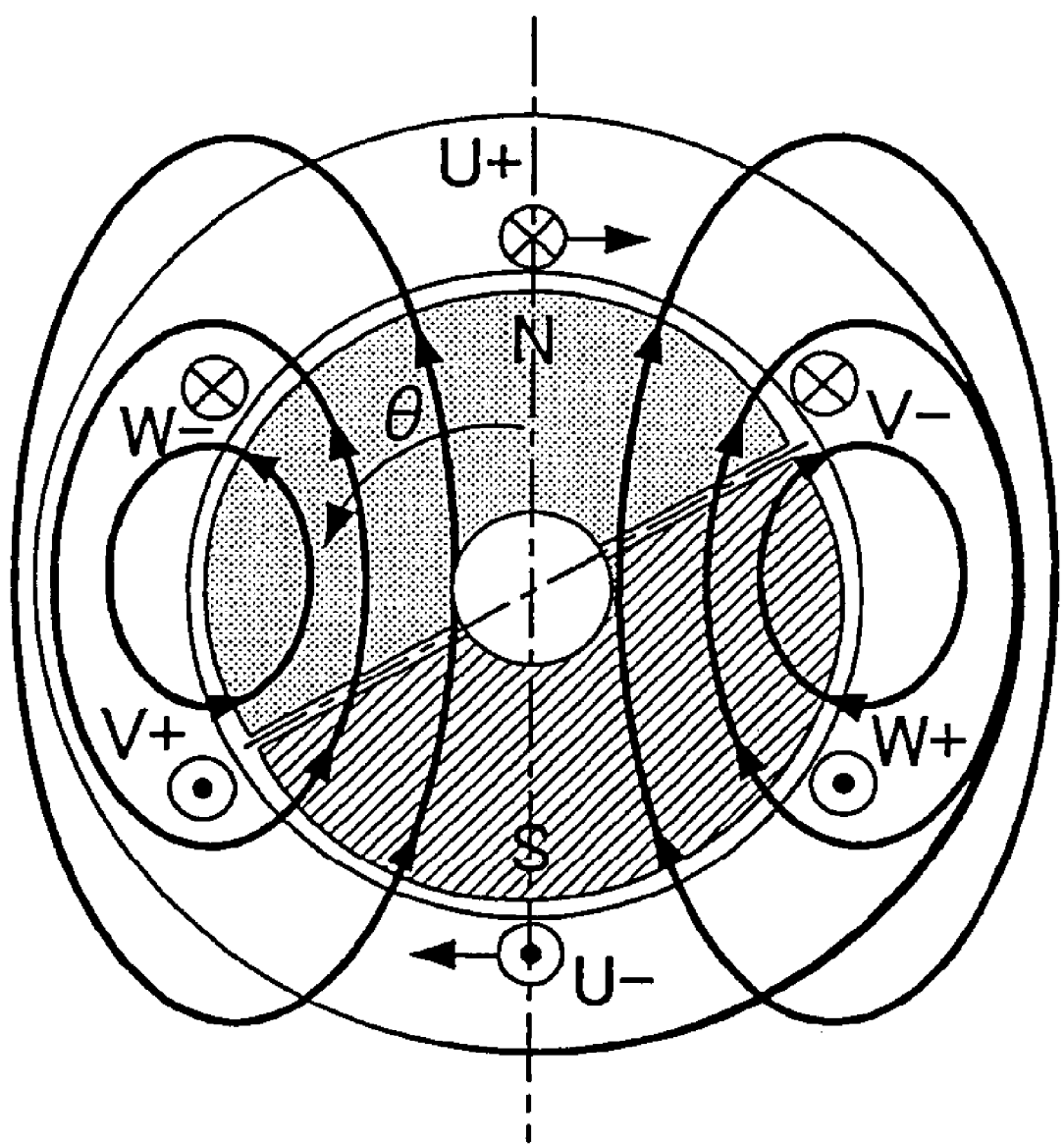
FIG. 1 is an explanatory view for the principle of operation when the present invention is applied to a synchronous motor using a permanent magnet.

FIG. 1 is an explanatory view for the principle of operation when the present invention is applied to a synchronous motor using a permanent magnet for a rotor.

In FIG. 1, U+, U−, V+, V−, W+, and W− are stator windings for U, V and W-phase, and N, S represents a magnetic pole for the rotor.

When an angle between an U-phase winding and magnetic flux and strength of a magnet are assumed to be $\Theta$ and M respectively, magnetic flux $\phi U$ for interlinking the U-phase winding is represented by the following.

$$\phi U = M \cdot \sin \Theta$$

Similarly, magnetic flux $\phi V$, $\phi W$ for interlinking V, W-phase windings are represented by $$\phi V = M \cdot \sin(\Theta + 2/3\pi)$$

$$\phi W = M \cdot \sin(\Theta + 4/3\pi)$$

In order to generate fixed torque by causing current to flow through U, V, W-phase windings having magnetic flux distribution as explained above, the following currents are caused to flow through windings of each phase.

$$IU = I \cdot \sin \Theta$$

$$IV = I \cdot \sin(\Theta + 2/3\pi)$$

$$IW = I \cdot \sin(\Theta + 4/3\pi)$$

Torque to be generated at that time is as follows:

$$\text{Generated torque} = IU \cdot \phi U + IV \cdot \phi V + IW \cdot \phi W$$
$$= (3/2) \cdot I \cdot M$$

Fixed torque not dependent on an angle $\Theta$ between the winding and the magnetic flux can be obtained.

On the other hand, in the present invention, the currents for flowing through the windings of each phase described above are made into a current obtained by superimposing, on current of fundamental sine wave, a current having a frequency which is three times as high as that of the fundamental sine wave current. In other words, currents IU, IV, IW of each phase of U, V and W phase are made into the following.

$$IU = I \cdot \sin\Theta + Ia \cdot \sin 3\Theta$$

$$IV = I \cdot \sin(\Theta + 2/3\pi) + Ia \cdot \sin 3\Theta$$

$$IW = I \cdot \sin(\Theta + 4/3\pi) + Ia \cdot \sin 3\Theta$$

In this respect, with respect to the amplitude I of the fundamental sine wave current, amplitude Ia of a current having a frequency which is three times as high as that of the fundamental sine wave current is set to a predetermined value smaller than amplitude I of the fundamental sine wave current. Torque generated at this time is as follows:

$$\text{Generated torque} = IU \cdot \phi U + IV \cdot \phi V + IW \cdot \phi W$$
$$= \{I \cdot \sin\Theta + Ia \cdot \sin 3\Theta\} \times M \cdot \sin\Theta +$$
$$\{I \cdot \sin(\Theta + 2/3\pi) + Ia \cdot \sin 3\Theta\} \times M \cdot \sin(\Theta + 2/3\pi) +$$
$$\{I \cdot \sin(\Theta + 4/3\pi) + Ia \cdot \sin 3\Theta\} \times M \cdot \sin(\Theta + 4/3\pi)$$
$$= (3/2) \cdot M \cdot I +$$
$$Ia \cdot M \cdot \sin 3\Theta \times \{\sin\Theta + \sin(\Theta + 2/3\pi) + \sin(\Theta + 4/3\pi)\}$$

In this case, since $\{\sin\Theta + \sin(\Theta + 2/3\pi) + \sin(\Theta + 4/3\pi)\} = 0$, $$\text{Generated torque} = (3/2) \cdot M \cdot I$$

and the same torque as the torque generated when driven with the current of the fundamental sine wave alone can be generated.

Figure 2:
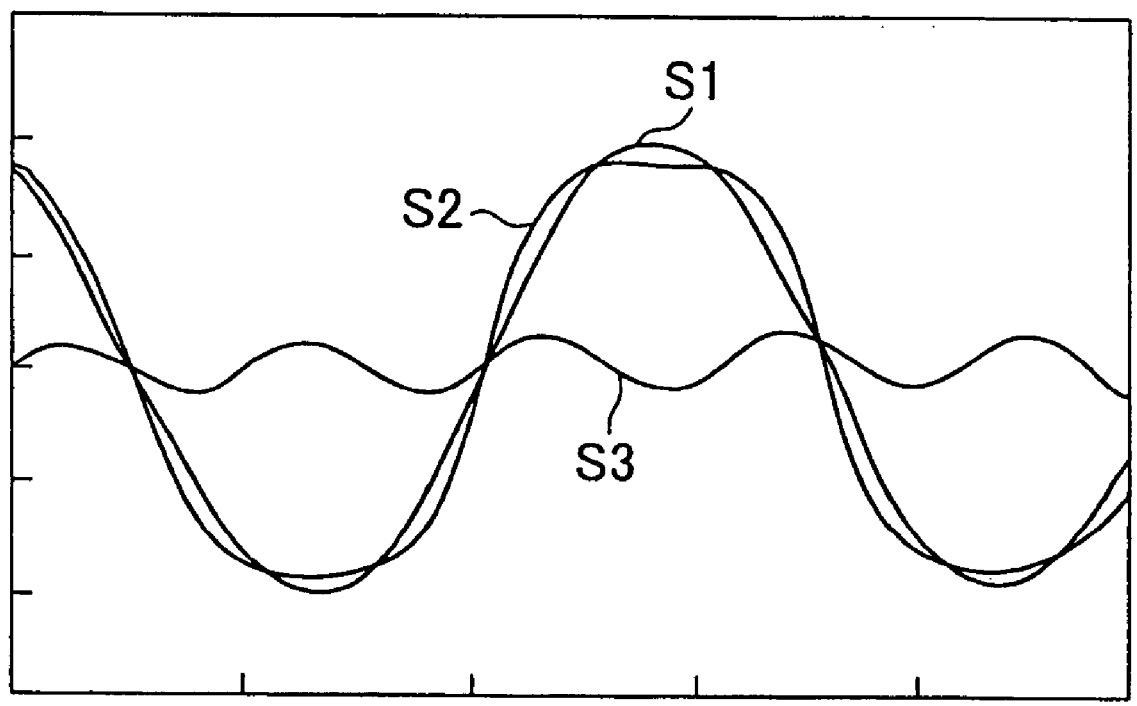
FIG. 2 is a view showing waveform of currents flowing through windings of each phase when a current of fundamental sine wave flows through a stator winding, and when current having a frequency which is three times as high as that of the fundamental sine wave is superimposed on the current of the fundamental sine wave for flowing.

However, in one case where the current of fundamental sine wave flows, and in the other case where a current having a frequency of three times as high as that of the fundamental sine wave is superimposed on the current of the fundamental sine wave for flowing, waveform of the currents flowing through the windings of each phase becomes as shown in FIG. 2. In this respect, in FIG. 2, amplitude Ia of the current having a frequency which is three times as high as that of the fundamental sine wave is set to $$Ia = (1 - \sqrt{3}/2) \cdot I$$

In FIG. 2, reference character S1 denotes waveform of "I·sin $\Theta$" of a current of the fundamental sine wave; reference character S2, waveform of a current of "I·sin $\Theta$ + Ia·sin 3$\Theta$" obtained by superimposing current having a frequency which is three times as high as that of the fundamental sine wave on the current of the fundamental sine wave; and reference character S3, waveform of a current having a frequency which is three times as high as that of the fundamental sine wave.

As apparent from FIG. 2, the maximum amplitude value of the current of $\{I \cdot \sin \Theta + Ia \cdot \sin 3\Theta\}$ obtained by superimposing the current having a frequency which is three times as high as that of the fundamental sine wave on the current of the fundamental sine wave is smaller than the maximum amplitude value of current I·sin $\Theta$ of the fundamental sine wave.

Comparing a first case where the current of fundamental sine wave flows through the windings of each phase with a second case where there flows the current obtained by superimposing the current having a frequency which is three times as high as that of the fundamental sine wave on the current of the fundamental sine wave, the value of torque generated in the first case is the same as in the second case, but a peak value of current flowing through windings of each phase in the second case can be made lower than in the first case. Conversely speaking, it means that, if an amplitude value (peak value) of current flowing through the windings in the first case is the same as in the second case, the value of torque generated in the second case can be greater than in the first case.

Figure 3:
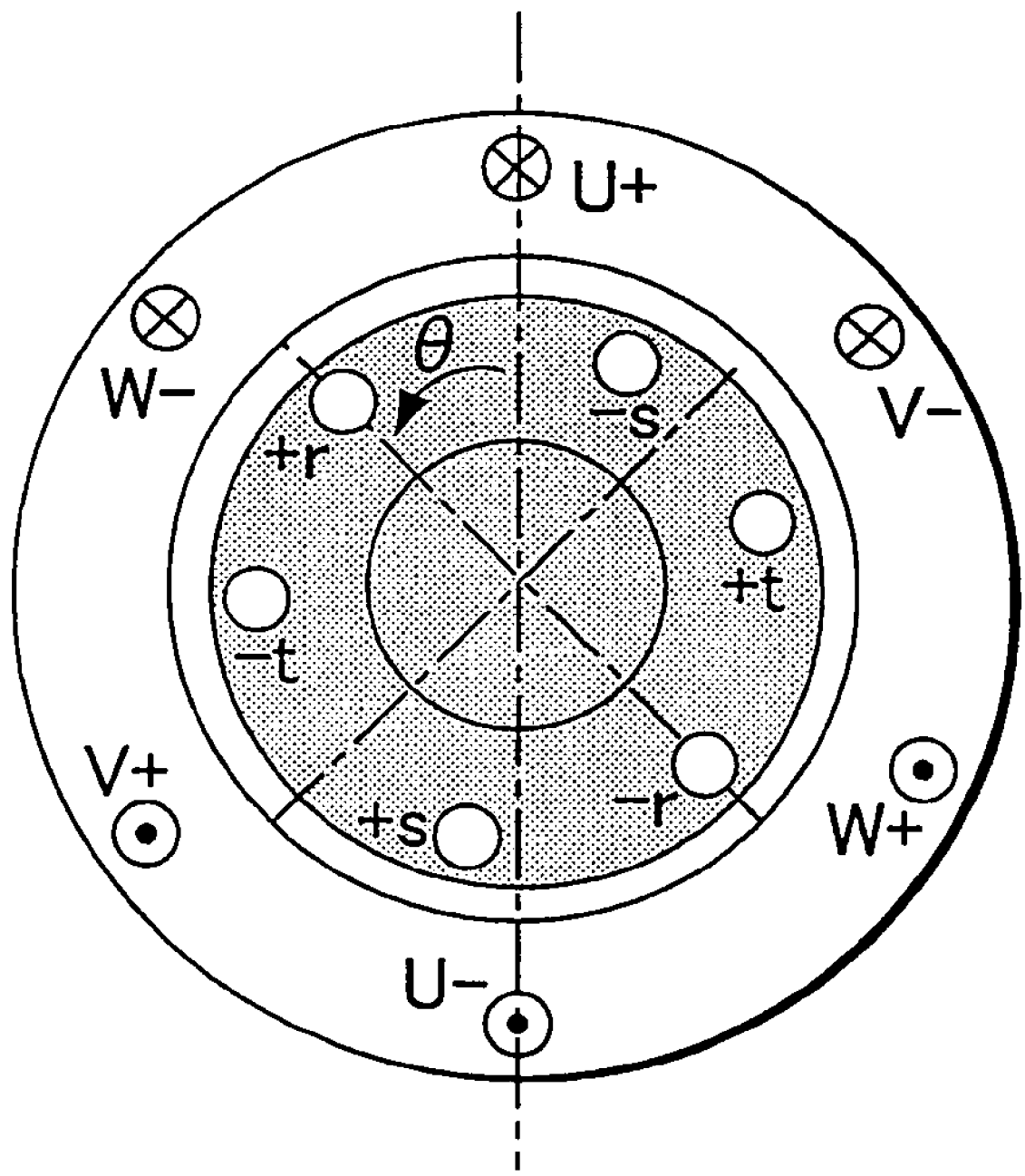
FIG. 3 is an explanatory view for the principle of operation when the present invention is applied to an induction motor.

Also, FIG. 3 is an explanatory view for the principle when the present invention is applied to an induction motor. In FIG. 3, windings of the stator are represented by U, V and W, and windings of the rotor are represented by r, s and t. In the induction motor, a current is introduced to the rotor by magnetic flux to be generated by a current of the stator winding to generate torque. In this case, when an angle between U-phase winding of the stator and r-phase winding r of the rotor is assumed to be $\Theta$, and currents IU, IV, IW of U, V, W-phase stator windings are assumed to be $$IU = I \cdot \sin \omega t + Ia \cdot \sin 3\omega t$$

$$IV = I \cdot \sin(\omega t + 2/3\pi) + Ia \cdot \sin 3\omega t$$

$$IW = I \cdot \sin(\omega t + 4/3\pi) + Ia \cdot \sin 3\omega t,$$

then magnetic flux $\phi r$ which the rotor winding r receives from the windings U, V, W of the stator is represented below.

$$\Phi r = M \cdot IU \cdot \cos\Theta + M \cdot IV \cdot \cos(\Theta + 2/3\pi) + M \cdot IW \cdot \cos(\Theta + 4/3\pi)$$
$$= M \cdot \{I \cdot \sin\omega t + Ia \cdot \sin 3\omega t\} \cdot \cos\Theta +$$
$$M \cdot \{I \cdot \sin(\omega t + 2/3\pi) + Ia \cdot \sin 3\omega t\} \cdot \cos(\Theta + 2/3\pi) +$$
$$M \cdot \{I \cdot \sin(\omega t + 4/3\pi) + Ia \cdot \sin 3\omega t\} \cdot \cos(\Theta + 4/3\pi)$$
$$= M \cdot I \cdot \{\sin\omega t \cdot \cos\Theta + \sin(\omega t + 2/3\pi) \cdot \cos(\Theta + 2/3\pi) +$$
$$\sin(\omega t + 4/3\pi) \cdot \cos(\Theta + 4/3\pi) + M \cdot Ia \cdot \sin 3\omega t\{\cos\Theta + \cos(\Theta +$$
$$2/3\pi) + \cos(\Theta + 4/3\pi)\}$$

In this case, since $\cos\Theta + \cos(\Theta + 2/3\pi) + \cos(\Theta + 4/3\pi) = 0$, $$\Phi r = M \cdot I \cdot \{\sin\omega t \cdot \cos\Theta + \sin(\omega t + 2/3\pi) \cdot \cos(\Theta + 2/3\pi) +$$
$$\sin(\omega t + 4/3\pi) \cdot \cos(\Theta + 4/3\pi)\}$$

In this respect, M is a constant.

As described above, magnetic flux which r-phase winding of the rotor receives becomes only a current component of fundamental sine wave that flows through the stator winding, and is not affected by a current component having a frequency three times as high as the fundamental sine wave. Similarly, magnetic flux φs, φt which s, t-phase windings of the rotor receive also becomes a current component of fundamental sine wave. For that reason, torque that is generated also becomes the same as torque generated when only the current of fundamental sine wave flows through each winding of the stator. As shown in FIG. 2, since the amplitude of current produced when current having a frequency which is three times as high as that of the fundamental sine is superimposed on the current of the fundamental sine wave becomes smaller than the amplitude of current produced when only the fundamental sine wave is caused to flow, it means that if a current of the same peak value is caused to flow through the stator winding, greater torque can be generated in a case where current having a frequency which is three times as high as that of the fundamental sine wave has been superimposed on the current of the fundamental sine wave.

Figure 4:
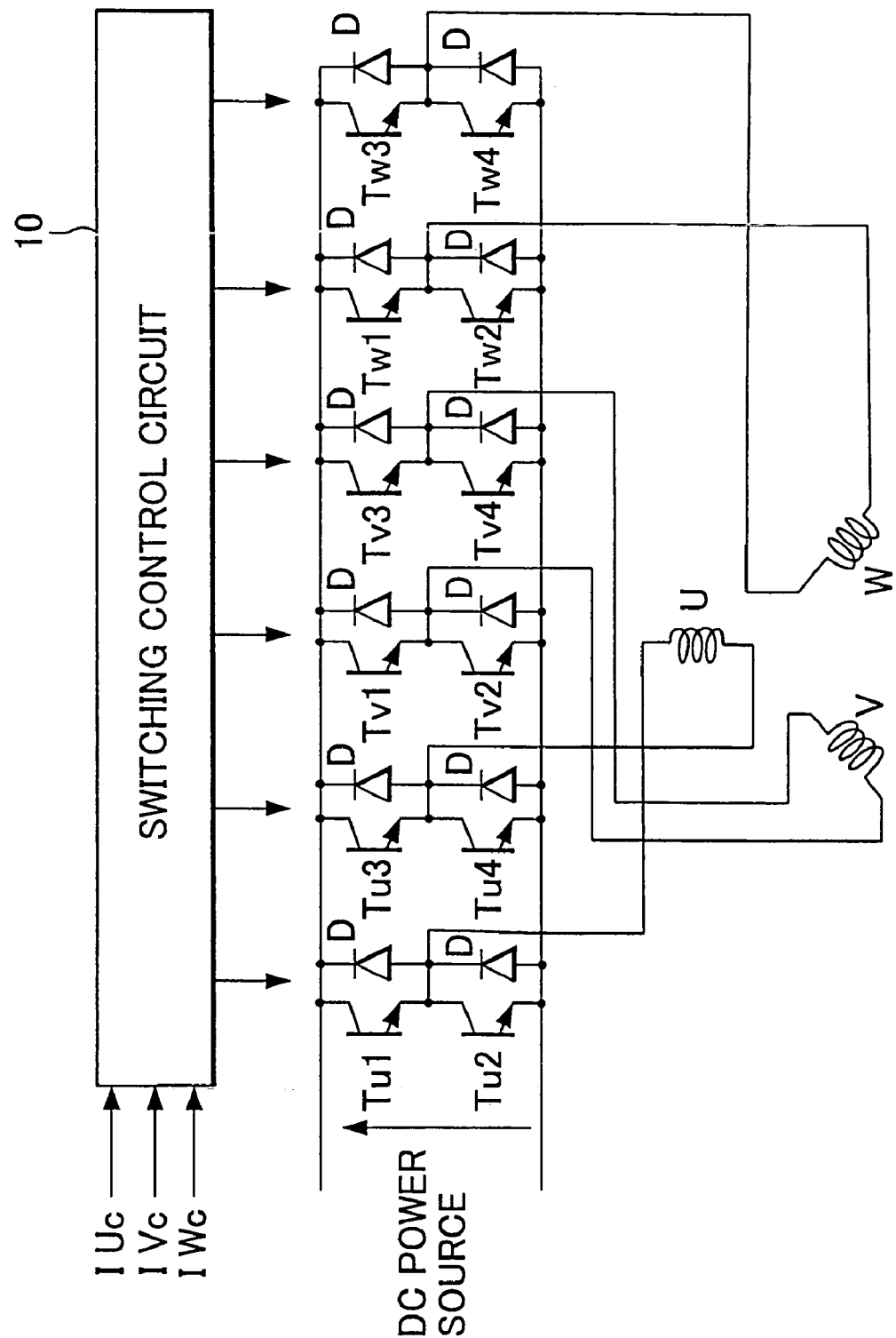
FIG. 4 is a block diagram of principal part showing a motor control unit according to one embodiment of the present invention.

FIG. 4 is a block diagram of principal part of the present embodiment in which the current having a frequency which is three times as high as that of the fundamental sine wave is superimposed on the current of the fundamental sine wave to cause the current to flow through the stator winding of the motor for driving the motor.

Figure 7:
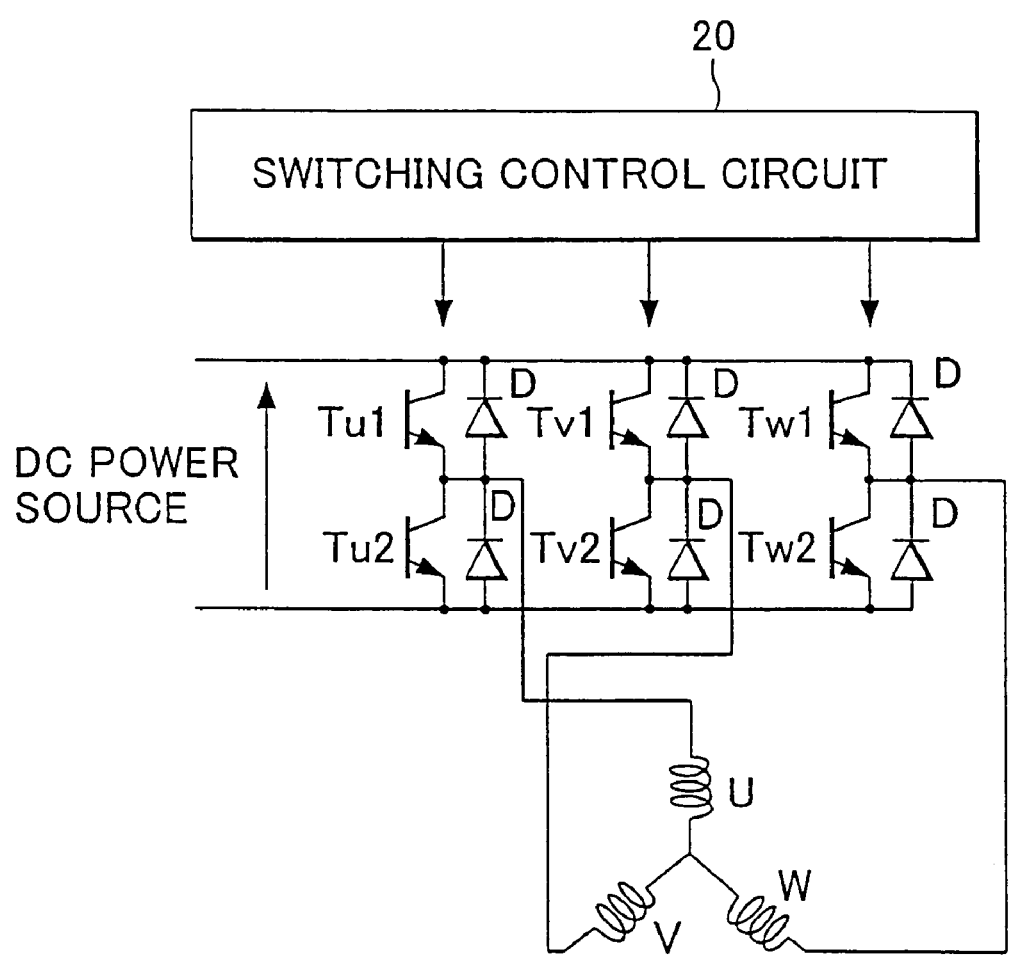
FIG. 7 is a view showing one example of a conventional driving method for a three-phase motor.

A motor driving system of the present invention is characterized in that stator windings of each phase are independently controlled. FIG. 7 is a block diagram of principal part showing a conventional motor control based on the PWM control. In the case of the conventional motor driving control, as shown in FIG. 7, windings of U, V and W-phase of the stator are connected to one another (in the example shown in FIG. 7, neutral points of each phase winding are connected), and by a PWM pulse signal to be outputted from a switching control circuit 20, switching elements Tu1, Tu2, Tv1, Tv2, Tw1 and Tw2 of the inverter circuit are switched to flow current through windings of each phase.

In the conventional driving system shown in FIG. 7, since the total sum of each winding current of three phase is 0, there is no problem if each phase winding is connected through the neutral points. In the present invention, however, since the current obtained by superimposing, on current of fundamental sine wave, a current having a frequency which is three times as high as that of the fundamental sine wave current is caused to flow for driving, the sum of the three-phase currents does not become equal to 0. For that reason, as shown in FIG. 4, windings of U, V and W-phase of the stator are independent, and the windings are not connected with one another. Thus, in order to flow current through the windings of each phase which are independent, a pair of series circuits in which two switching elements are connected in series respectively are provided. A circuit for flowing current through the U-phase winding will be described. Between DC power sources, a switching element Tu1 and a switching element Tu2 are connected in series in a forward direction, and to each switching element Tu1, Tu2, diodes D are connected in parallel in the opposite direction respectively. In the same manner as this series circuit, between DC power sources, a switching element Tu3 and a switching element Tu4 are connected in series in a forward direction, and to each switching element Tu3, Tu4, diodes D are connected in parallel in the opposite direction respectively.

A connecting point between the switching element Tu1 and the switching element Tu2 is connected to one terminal of the U-phase winding, and a connecting point between the switching element Tu3 and the switching element Tu4 is connected to the other terminal of the U-phase winding. The same is also applicable to V-phase and W-phase, and there are a pair of series circuits in which two switching elements are connected in series for each phase, and connecting points between two switching elements of the series circuit are connected to terminals of the winding corresponding thereto respectively.

Figure 5:
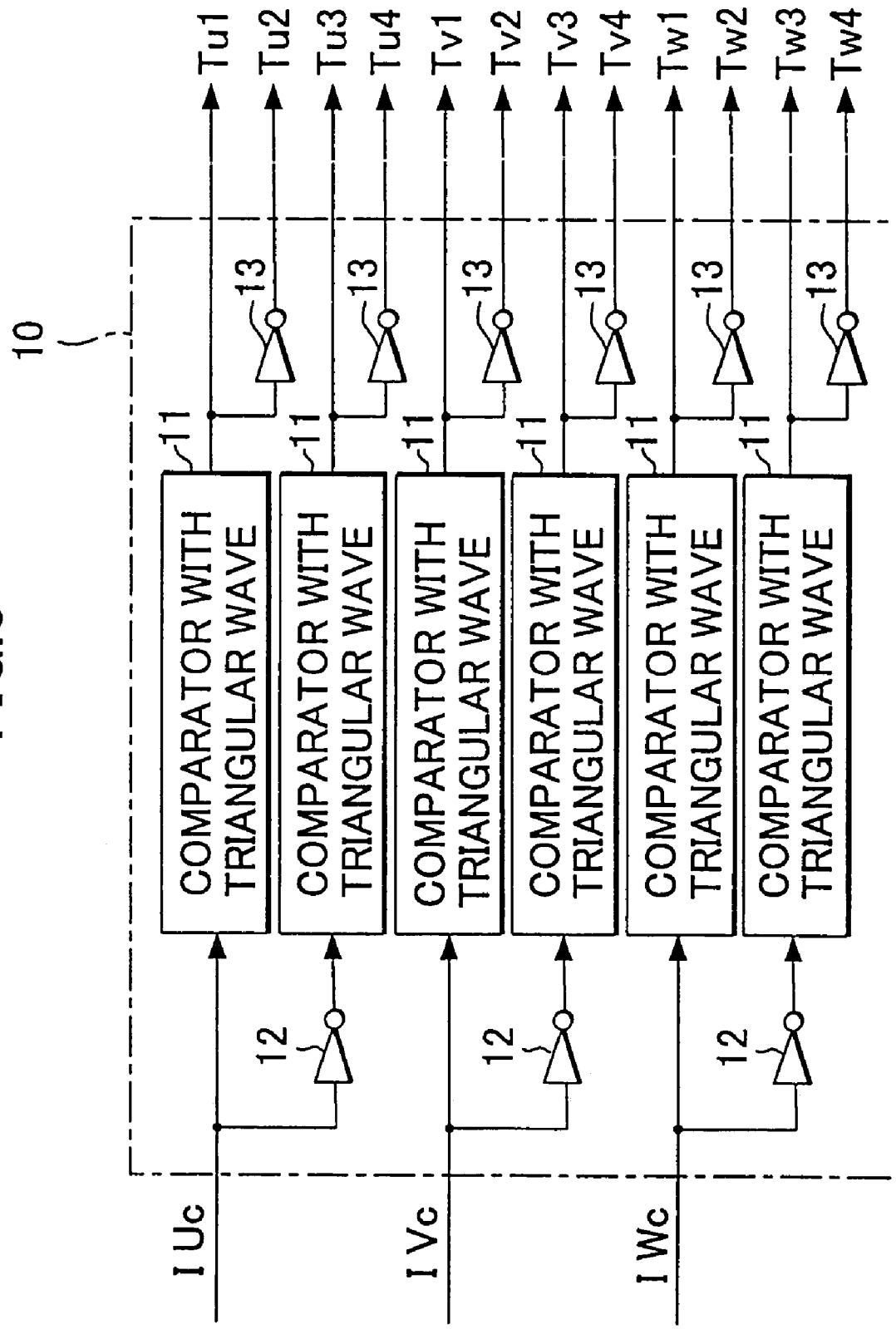
FIG. 5 is a detailed block diagram showing a switching control circuit in the motor control circuit of FIG. 4.

These switching elements Tu1 to Tu4, Tv1 to Tv4, and Tw1 to Tw4 are switched through a signal from a switching control circuit 10, and are controlled in such a manner that the current obtained by superimposing the current having a frequency which is three times as high as that of the fundamental sine wave current on the current of the fundamental sine wave flows through the windings of each phase. FIG. 5 is a detailed block diagram showing the switching control circuit 10. For each of the U, V and W-phase, there is constructed a circuit of the same form composed of two each of comparators 11, inversion circuits 12 and inversion circuits 13.

A command value IUc (=I·sin ωt+Ia·sin 3ωt) of the U-phase is compared with a triangular wave by a comparator 11, a switching control signal of an output signal that is a comparison result from the comparator 11 is outputted to the switching element Tu1, and an inversion switching control signal obtained by inverting the switching control signal by an inversion circuit 13 is outputted to the switching element Tu2. Also, an inverted command value obtained by inverting the command value IUc by the inversion circuit 12 is compared with the triangular wave by the comparator 11, a switching control signal that is an output signal of the comparison result is outputted to the switching element Tu3 and an inversion switching signal obtained by inverting the switching control signal by the inversion circuit 13 is outputted to the switching element Tu4.

Similarly, a switching control signal of a comparison result between a command value IVc (=I·sin(ωt+2/3π)+Ia·sin 3ωt) to the V-phase and the triangular wave is outputted to a switching element Tv1, and an inversion switching control signal thereof is outputted to a switching element Tv2. Also, a switching control signal of a comparison result between an inverted command value obtained by inverting a command value IVc and the triangular wave is outputted to a switching element Tv3, and the inversion switching control signal is outputted to a switching element Tv4.

Further, a switching control signal of a comparison result between a command value IWc (=I·sin(ωt+4/3π)+Ia·sin 3ωt) to the W-phase and the triangular wave is outputted to a switching element Tw1, and an inversion switching control signal thereof is outputted to a switching element Tw2. Also, a switching control signal of a comparison result between an inverted command value obtained by inverting a command value IWc and the triangular wave is outputted to a switching element Tw3, and the inversion switching control signal is outputted to a switching element Tw4.

Figure 6:
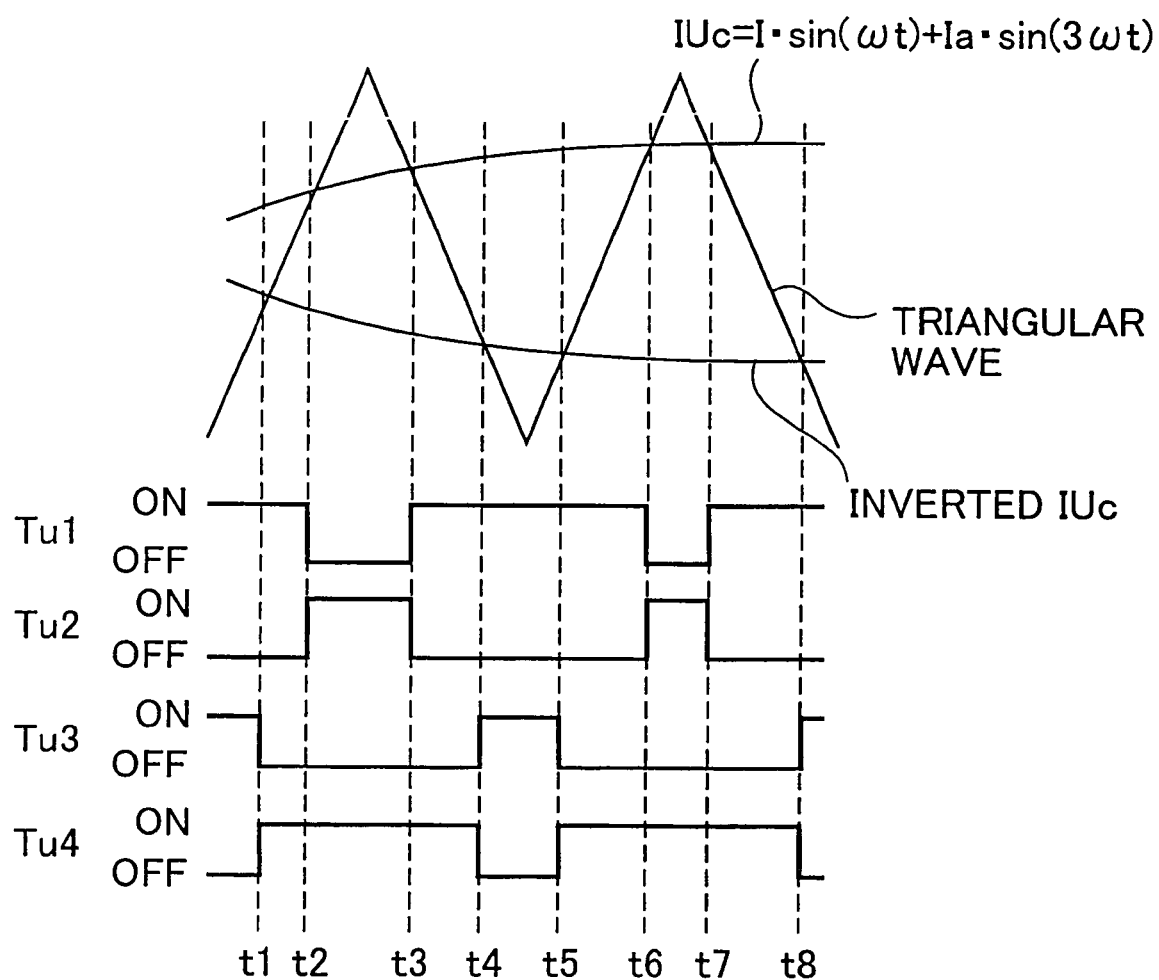
FIG. 6 is a view explaining creation of a switching control signal by comparing a command value with a triangular wave in the switching control circuit of FIG. 5.

FIG. 6 is an explanatory view illustrating comparison between a command value and the triangular wave by means of the comparator 11 and an output signal. FIG. 6 explains an example of the U-phase, and shows an example in which the command value IUc (=I·sin ωt+Ia·sin 3ωt) of the U-phase is compared with the triangular wave, and the inverted command value obtained by inverting the command value IUc by the inversion circuit 12 is compared with the triangular wave to generate an output signal.

The command value IUc of the U-phase is compared with the triangular wave, and when the command value is larger than the triangular wave, a switching control signal (high-level signal) for turning ON the switching element is outputted. When the command value is smaller than the triangular wave conversely, a switching control signal (low-level signal) for turning OFF the switching element is outputted, and this switching control signal is outputted to the switching element Tu1. Also, an inversion switching control signal obtained by inverting this signal by the inversion circuit 13 is outputted to the switching element Tu2.

Also, an inverted command value obtained by inverting the U-phase command value IUc by the inversion circuit 12 is compared with the triangular wave, and in a similar way, when the inverted command value is larger than the triangular wave, a switching control signal (high-level signal) for turning ON the switching element is outputted. When the command value is smaller than the triangular wave conversely, a switching control signal (low-level signal) for turning OFF the switching element is outputted, and this switching control signal is outputted to the switching element Tu3. Also, an inversion switching control signal obtained by inverting this switching control signal by the inversion circuit 13 is outputted to the switching element Tu4. The same is also applicable to the V-phase and the W-phase.

Next, the description will be made of an operation of the present embodiment. As far as the process where current having a frequency of three times as high as that of the fundamental sine wave is superimposed on the current of the fundamental sine wave to create the command value of each phase, it is within a conventional technique. When the command value of each phase is inputted into the switching control circuit 10, the switching control circuit 10 will compare each of those command values and an inverted command value obtained by inverting the command value with the triangular wave by the comparator 11 to output the switching control signal as described above.

Switching control signals resulted from the comparison between the command values IUc, IVc, IWc of the U, V and W-phase and the triangular wave are inputted into the switching elements Tu1, Tv1, Tw1, respectively, and when the switching control signal is an ON-signal (high-level signal), these switching elements will be turned ON. Also, a signal obtained by inverting this switching control signal is inputted into the switching elements Tu2, Tv2, and Tw2, and when this inversion switching control signal is an ON signal (high-level signal), these switching elements will be turned ON. As a result, it is impossible that the switching elements Tu1 and Tu2, Tv1 and Tv2, Tw1 and Tw2 are both turned ON to cause the both ends of the DC power source short-circuited.

Also, similarly, switching control signals resulted from a comparison between inverted command values of the command values IUc, IVc, IWc of the U, V and W-phase and the triangular wave are inputted into the switching elements Tu3, Tv3, Tw3, respectively, and the inversion switching control signals are inputted into the switching elements Tu4, Tv4, and Tw4. Even in this case, it is impossible that the switching elements Tu3 and Tu4, Tv3 and Tv4, Tw3 and Tw4 are both turned ON to cause the both ends of the DC power source short-circuited.

The description will be made of current flowing through a winding by taking as an example a case where the command value IUc (=I·sin ωt+Ia·sin 3ωt) is inputted into the U-phase as shown in FIG. 6. As described above, with the switching control signal based on the command value IUc to the U-phase, the switching elements Tu1 to Tu4 are ON/OFF controlled as shown in FIG. 6. In sections (t1 to t2, t3 to t4, t5 to t6, t7 to t8) in which the switching elements Tu1 and Tu4 are turned ON, current flows from a plus terminal of the DC power source through switching element Tu1, the U-phase winding, and the switching element Tu4 to minus terminals of the DC power source. Thereby, a current obtained by superimposing, on the current of the fundamental frequency, a current having a frequency which is three times as high as that of the current, which is equal to a command value, will flow. It is to be noted that if command for rotation in the reverse direction is outputted, the switching elements Tu3, Tu2 are both turned ON and current flows through the U-phase winding via these switching elements.

Considering the fact that when current obtained by superimposing, on current of fundamental sine wave, a current having a frequency which is three times as high as that of the fundamental sine wave current is caused to flow through a stator winding, as described below, the total sum of currents of each phase does not become equal to "0", great torque is generated, in the case of the present invention, by constructing windings of each phase independent of one another and causing current obtained by superimposing, on current of fundamental sine wave, a current having a frequency which is three times as high as that of the fundamental sine wave current to flow through the windings of each phase. For example, when amplitude Ia of current having a frequency which is three times as high as the fundamental frequency relative to amplitude I of the current of the fundamental frequency is superimposed on the current of fundamental sine wave, under the condition Ia=0.16×I, to drive the present embodiment, the maximum value of this current becomes 0.87×I, reduction in current of 13%. However, the generated torque in this case is the same as in the case where the current having a frequency which is three times is not superimposed.

According to the present invention, as current obtained by superimposing, on current of fundamental sine wave, a current having a frequency which is three times as high as that of the fundamental sine wave current is caused to flow, greater torque can be generated even with the same peak current as in the conventional case where only the fundamental sine wave flows for driving.

The invention claimed is:

1. A control unit for a three-phase AC motor in which each winding of three phases is independently constructed, wherein a current obtained by adding a fundamental sine wave current to a current having a frequency which is three times as high as that of said fundamental sine wave current is given to windings of each phase for driving and controlling the three-phase AC motor;

wherein the current obtained by adding said fundamental sine wave current to the current having a frequency which is three times as high as that of said fundamental sine wave current is supplied, independently for each phase, by a combination of a first series circuit comprising first and second switching elements connected in series, and a second series circuit comprising third and fourth switching elements connected in series; and wherein:

a command value obtained by adding, to said fundamental sine wave current, the current having the frequency which is three times as high as that of said fundamental sine wave current, and an inverted command value obtained by inverting said command value are each compared with a triangular wave to determine a switching control signal;

on the basis of a switching signal determined by said command value, said first and second switching elements are ON/OFF controlled; and on the basis of a switching signal obtained by said inverted command value, said third and fourth switching elements are ON/OFF controlled, thereby causing the current obtained by super imposing, on the current of the fundamental sine wave, the current having the frequency which is three times as high as that of the fundamental sine wave current to flow through windings of each phase.

2. The motor control unit according to claim 1, wherein said AC motor is a synchronous motor.

3. The motor control unit according to claim 1, wherein said AC motor is an induction motor.

4. The motor control unit according to claim 1, wherein the current having the frequency which is three times as high as that of said fundamental sine wave current has a predetermined amplitude which is smaller than that of said fundamental sine wave current.

* * * * *